Aug. 14, 1951 J. ROBINSON 2,563,869

RADIO RECEIVING AND TRANSMITTING SYSTEM

Filed June 10, 1948 2 Sheets-Sheet 1

INVENTOR
James Robinson

By Watson, Cole, Grindle & Watson

Aug. 14, 1951 J. ROBINSON 2,563,869

RADIO RECEIVING AND TRANSMITTING SYSTEM

Filed June 10, 1948 2 Sheets-Sheet 2

INVENTOR

James Robinson

By Watson, Cole, Grindle + Watson

Patented Aug. 14, 1951

2,563,869

UNITED STATES PATENT OFFICE 2,563,869

RADIO RECEIVING AND TRANSMITTING SYSTEM

James Robinson, London, England

Application June 10, 1948, Serial No. 32,154
In Great Britain June 12, 1947

20 Claims. (Cl. 250—15)

Figure 1:
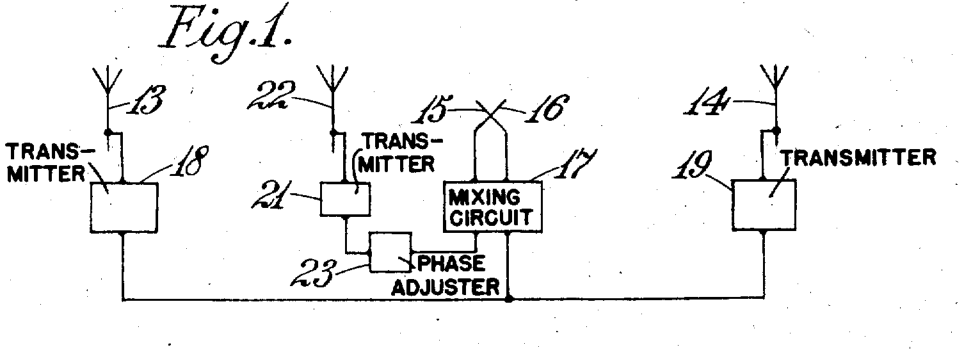

This invention relates to radio receivers and radio retransmitting systems for retransmitting over a limited area intelligence received from a distant radio transmitter.

It is an object of this invention to provide a novel receiver for use in, for example, receiving signals radiated from a distant transmitter, independent or substantially independent of further unwanted signals of the same or approximately the same frequency as the desired signals.

It is a further object of this invention to enable the reception of desired radio signals emanating from a fixed direction with the suppression or reduction of signals emanating from directions different from the fixed direction.

It is a further object of this invention to provide a novel retransmitting system in which the signals received from a distant transmitting station are received at a receiver and fed to a retransmitter where the received signals are retransmitted at the same or different frequency and in which the retransmission, which is of much greater magnitude than the signals to be received from the distant station, are prevented from overpowering the receiver and preventing the reception from the distant station. It is a still further object of the invention to enable the effect of the retransmitted signals on the receiver to be zero and for this purpose to provide automatic control means for the retransmitters controlled by the reception.

Further objects of the invention will become apparent from the following description.

The novel receiver of this invention comprises two receiving aerial arrays, means for giving a first output in accordance with the sum of the signals induced in said arrays, means for giving a second output in accordance with the difference of the signals induced in said arrays and means for maintaining said difference output at a minimum. Circuits have already been suggested for giving signals in accordance with the sum and difference of the signals induced in two aerials but the present invention differs therefrom by the provision of means for maintaining the difference signal at a minimum. By so doing, it is possible by suitable positioning of the aerials to render the sum signal independent of undesired received signals.

The novel retransmitting system of this invention comprises two receiving aerial arrays arranged to receive the transmissions from a distant transmitter, means for giving a first output in accordance with the sum of the voltages induced in said arrays and for giving a second output in accordance with the difference of said voltages, one or more retransmitters fed by the first output and transmitting at a frequency approximately equal to that of the transmissions of the distant transmitter and means for maintaining the second output at a minimum. There has already been suggested a retransmitting system in which the effect of the retransmissions on the receiver has been reduced to a minimum by employing two retransmitting aerials and locating the receiver at a null point in the field produced by the retransmissions. The present invention, therefore, differs from the previous suggestion by the manner in which this effect is achieved.

Figure 2:
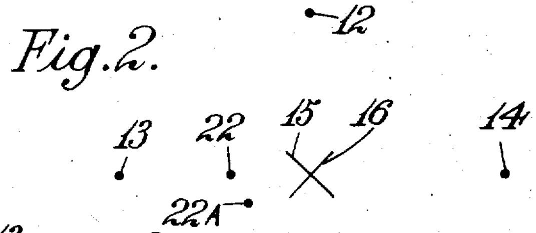
Figure 3:
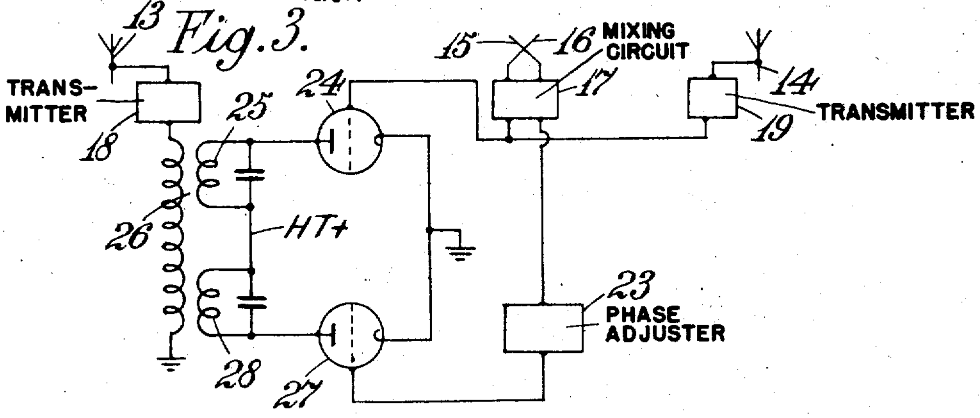
Figure 4:
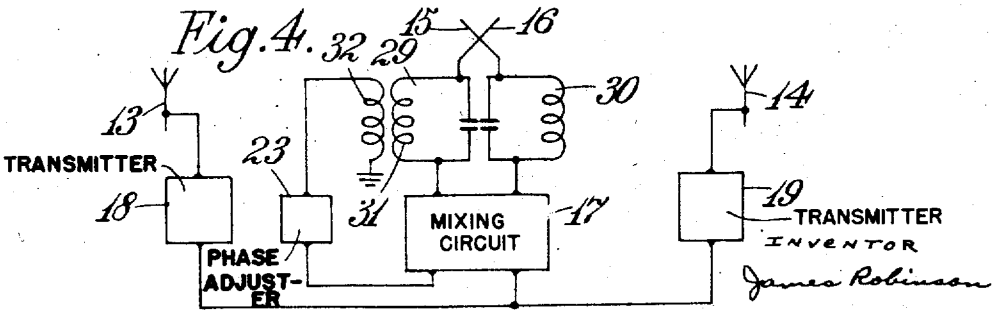
Figure 5:
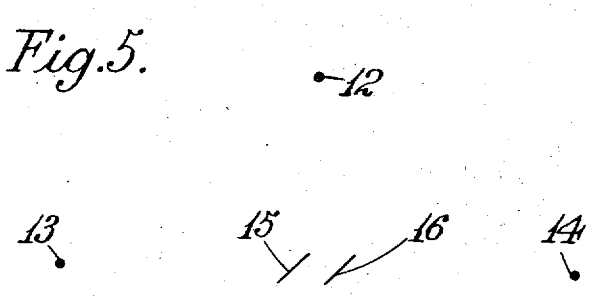
Figure 6:
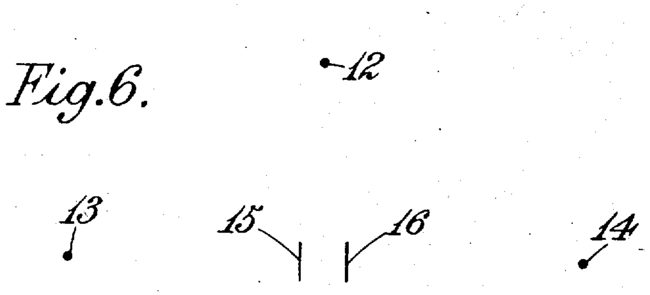
Figure 7:
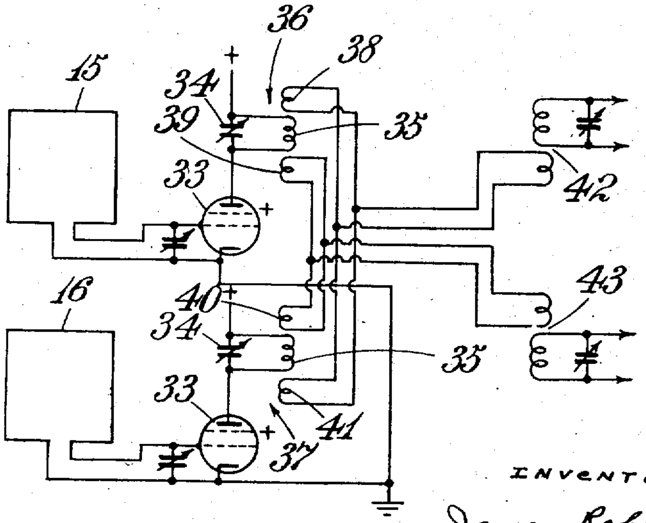

The invention and the objects thereof will be more clearly understood from the following description of retransmitting or boosting systems, reference being made to the accompanying drawings in which:

Figure 1 is a schematic showing of the layout of one form of re-transmitting system, Figure 2 is a plan view corresponding to Figure 1 illustrating the relative positions of the transmitters, Figures 3 and 4 are schematic showings of alternative forms of systems, Figures 5 and 6 illustrate alternative methods of locating the directional aerials relative to each other, and Figure 7 is a diagram of the circuits associated with the directional aerials.

Referring to Figures 1 and 2, 12 represents a distant transmitter and 13 and 14 local or boosting transmitting aerials. It is desired to retransmit over a limited area by means of the aerials 13, 14 the intelligence received from transmitter 12. For this purpose, a receiving aerial array comprising two directional loop aerials 15, 16, with their planes intersecting, is positioned midway between boosting transmitting aerials 13, 14, and the aerials 13, 14 are arranged so that the line therethrough is at right angles to the line through the transmitter 12 and aerials 15, 16. The planes of the aerials 15, 16 are arranged to make equal angles with the line through them and the transmitter 12.

The signals induced in the aerials 15, 16 are separately added and subtracted in the circuit 17, which will be described in more detail hereinafter, and the sum signal produced thereby is fed to transmitters 18, 19 which in turn feed the transmitting aerials 13, 14 respectively for retransmission of the intelligence received from transmitter 12.

Suppose the angle between the planes of the aerials 15, 16 and the line joining the aerials and distant transmitter 12, is $\theta$.

Then the voltage induced in one of the loop aerials is $$V_1 = A \cos \theta + B_1 \cos (90° - \theta) + B_2 \cos (90° + \theta)$$

while the voltage induced in the other is $$V_2 = A \cos \theta + B_1 \cos (90° + \theta) + B_2 \cos (90° - \theta)$$

where $A_1$, $B_1$, $B_2$ are values dependent only on the field strength of the radiations at the receiver from the distant transmitter and the local transmitters respectively. Then $$V_1 = A \cos \theta + B_1 \sin \theta - B_2 \sin \theta$$

$$V_2 = A \cos \theta - B_1 \sin \theta + B_2 \sin \theta$$

and $$V_1 + V_2 = 2A \cos \theta$$

$$V_1 - V_2 = 2(B_1 - B_2) \sin \theta$$

Hence the sum of the voltages induced in the aerials is proportional to the field strength of the radiation received from the distant transmitter while the difference of the voltages is proportional to the difference in the strengths of the radiations received from the local transmitters.

Therefore, if the angles the loop aerials 15, 16 make with the line through the receiver and transmitter are accurately equal, and the transmitting aerials 13, 14 and receiving aerials 15, 16 are accurately collinear, then the signals fed to transmitters 18, 19 are dependent only on the reception from the distant transmitter 12. These criteria are, however, very difficult to obtain in practice and it is advisable to provide some automatic control by which this is effected automatically in order to prevent the weak signals from distant transmitter 12 from being swamped by the much more powerful signals from the nearer transmitter aerials 13, 14. For this purpose, a third local transmitter 21 and associated aerial 22 are provided. This third aerial 22 is positioned collinearly with aerials 13, 14 but is preferably nearer to the loop aerials 15, 16. The difference voltage from the circuit 17 is applied to a phase adjuster 23 of conventional type to transmitter 21 in such phase that the difference voltage is maintained substantially zero. Then if the planes of aerials 15, 16 make with the line joining the aerials and the distant transmitter 12 angles $\theta$ and $(\theta + \alpha)$ respectively, $\alpha$ being small, the voltage induced in aerial 15 is:

$$V_1 = A \cos \theta + B_1 \sin \theta - B_2 \sin \theta$$

while the voltage induced in aerial 16 is:

$$V_2 = A \cos (\theta + \alpha) - B_1 \sin (\theta + \alpha) + B_2 \sin (\theta + \alpha)$$

$$V_1 + V_2 = A (\cos \theta = \cos (\theta + \alpha)) + (B_1 - B_2)(\sin \theta - \sin (\theta + \alpha))$$

and $$V_1 - V_2 = A (\cos \theta - \cos (\theta + \alpha)) + (B_1 - B_2)(\sin \theta + \sin (\theta + \alpha))$$

If $$V_1 - V_2 = 0; \; B_1 - B_2 = -A \left( \frac{\cos \theta - \cos (\theta + \alpha)}{\sin \theta + \sin (\theta + \alpha)} \right)$$

Substituting this value for $(B_1 - B_2)$ in the above expression for $(V_1 + V_2)$, there is derived an expression depending only on A, $\theta$ and $\alpha$.

Hence when the difference voltage is maintained zero, the sum voltage, with which the transmitters 18, 19 are fed, is independent of the receptions at the receiver from aerials 13, 14. In effect, the transmitter 21 is arranged to transmit signals which cancel out the resultant field at the aerials 15, 16 due to the transmissions from transmitters 18, 19.

It may occur that a large metallic object is located off the line through the aerials 13, 14, which object causes the resultant field at the aerials 15, 16 of the transmissions from transmitting aerials 13, 14 to lie at an angle to the line through transmitters 13, 14. In this case, in order to cancel the effect of the resultant field of the aerials 13, 14 the auxiliary local transmitting aerial 22 must be displaced from this line, the exact position being found by trial and error. Thus, in Figure 2 an alternative position for the transmitter 22 is shown at 22A.

In the system illustrated in Figure 3, the difference voltage from circuit 17 is made to control the amplitude and phase of the transmission from the aerial 13. As before, transmitter 19 feeding transmitting aerial 14 is fed by the sum signal from circuit 17. The sum signal is also applied through a buffer valve 24 to a primary winding 25 of a transformer 26. The difference voltage from circuit 17 is applied through the phase adjuster 23 and a further buffer valve 27 to a second winding 28 of the transformer 26. The output from transformer 26 is applied to the transmitter 18 and transmitting aerial 13. The amplitude and phase of the transmission from aerial 13 is then controlled to maintain the difference voltage as small as possible, in which case the sum voltage is made almost independent of the transmissions from the local transmitters.

In Figure 4, the difference voltage is maintained as small as possible by feeding it in the correct phase to one of the loop aerials. In this case, the outputs from the loop aerials 15, 16 are applied through tuned circuits 29, 30 to the circuit 17. The sum voltage is applied to transmitters 18, 19 as before and the difference voltage is applied through the phase adjuster 23 to a coil 32 coupled with the coil 31 of tuned circuit 29. The phase of the difference voltage fed back is arranged to be such that the difference voltage is automatically maintained substantially zero as before.

In a still further form of the invention, the difference voltage may be fed to both the receiving aerials 15, 16 in opposite phase in order to obtain the same result. This may be done by coupling a coil with the coil of the tuned circuit 30 and feeding it in correct phase with the difference voltage in the same manner in which coil 32 is fed.

It is not essential that the planes of the directional aerials 15, 16 be crossed. Thus, as shown in Figures 5 and 6 the planes may be parallel. In Figure 5, the aerials 15, 16 are inclined to the line through them and the distant transmitter 12. In Figure 6 they are arranged so that the directions of optimum reception are directed at the aerial 12. Taking the case shown in Figure 5, suppose the angle between the planes of the loops and the line joining the array with the transmitter 12 is $\theta$. Then, if the distance between the aerials is small compared with the wavelength, the voltages induced in the aerials will be equal and the sum of the voltages induced will not be independent of the transmissions from transmitting aerials 13, 14 except when these transmissions result in a zero field at the aerials. In order that the sum signal may be made independent of the local transmissions, the two aerials are spaced an odd number of half wavelengths apart on the line through aerials 13, 14. The voltages induced in the two aerials 15, 16 by the transmission from aerial 12, say, will be equal and opposite, so that $$V_1=A\cos\theta+B_1\sin\theta-B_2\sin\theta$$

and $$V_2=A\cos\theta-B_1\sin\theta+B_2\sin\theta$$

where $V_1$, $V_2$, A, $B_1$, and $B_2$ represent the same variables as before.

$$V_1+V_2=2A\cos\theta$$

and $$V_1-V_2=(B_1-B_2)\sin\theta$$

Hence, as before the sum voltage is independent of the transmissions from the local transmitters if the two aerials make equal angles accurately with the line through the array and the transmitter 12. However, as before this is not always possible and hence the difference voltage is used to control the system to maintain the latter voltage substantially zero and hence the sum voltage dependent only on the transmission from the transmitter 12. While the system in Figure 6 may be used in the same manner as is described with reference to Figures 1, 3 and 4 and hence has the same advantages, it has the further advantage that since signals from transmitting aerials 13, 14 are received by the loop aerials 15, 16 at right angles to their direction of optimum reception, the signals induced in the aerials by the transmissions from the local transmitters will be even smaller than previously.

In the systems illustrated in Figures 5 and 6, the directional receiving aerials 15, 16 may be replaced by non-directional aerials placed apart in the direction through the retransmitting aerials by a distance equal to an odd number of half wave-lengths of the transmissions. When the non-directional receiving aerials are arranged in this way, the sum voltage will be independent of the transmissions from transmitters 13 and 14 if the difference voltage is maintained substantially zero, as explained above. In effect, the two receiving aerials 15, 16 form, when combined, a directional array the optimum reception of which being directed at the distant transmitter 12.

In the system described with reference to Figures 1 to 6, it is advantageous to have the transmitters 13, 14 equally spaced from the aerials 15, 16 and arranged in power and phase so that the field strength at the aerials 15, 16 due to these transmitters is substantially zero. This reduces still further the component of the local transmissions in the sum voltage and in the case of the system of Figures 1 and 2 enables the power of the transmitter 21 to be relatively small.

Turning now to Figure 7, which is a circuit diagram of the circuit 17 of Figures 1, 3 and 4, 15, 16 illustrate the loop aerials as before. The voltage induced in aerial 15 is applied to the control grid of a valve 33 having in its anode circuit a tuned circuit consisting of a condenser 34 and a primary winding 35 of a transformer 36. The voltages induced in aerial 16 are applied to a similar circuit, the transformer in this case being 37. Transformer 36 has two secondary windings 38, 39 while transformer 37 has secondary windings 40, 41 and windings 39, 40 are connected in series while windings 38, 41 are connected in series opposition. The primary winding of a further transformer 42 is connected across the connections between secondary windings 38, 41 and the primary winding of transformer 43 is connected across those of windings 39, 40. The voltage induced in the secondary winding of transformer 42 is then proportional to the difference of the voltages induced in aerials 15, 16 while that induced in the secondary winding of transformer 43 is proportional to the sum of the voltages induced in the aerials.

I claim:

1. A retransmitting system comprising two receiving directional aerial arrays, the angles the directions of optimum reception of said arrays being approximately equally inclined to the direction of reception of signals from a distant transmitter, means for giving a first output in accordance with the sum of the voltages induced in said arrays and for giving a second output in accordance with the difference of said voltages, two retransmitting aerials located at either side of the receiving aerials approximately on the line through the receiving aerials substantially at right angles to the direction of reception of signals at the receiving aerials from the distant transmitter and means for controlling the transmission from said retransmitting aerials in accordance with the said first output.

2. A retransmitting system comprising two receiving directional aerial arrays, the angles the directions of optimum reception of said arrays being approximately equally inclined to the direction of reception of signals from a distant transmitter, means for giving a first output in accordance with the sum of the voltages induced in said arrays and for giving a second output in accordance with the difference of said voltages, two retransmitting aerials one at either side of the receiving aerials located approximately on the line through the receiving aerials substantially at right angles to the direction of reception of signals from the distant transmitter, transmitters feeding said retransmitting aerials and fed in turn by the said first output and means for controlling the transmission from one of said retransmitting aerials in accordance with the said second output whereby the said second output is maintained substantially zero and the said first output substantially independent of the transmissions from said retransmitting aerials.

3. A retransmitting system comprising two receiving directional aerial arrays, the angles the directions of optimum reception of said arrays being approximately equally inclined to the direction of reception of signals from a distant transmitter, means for giving a first output in accordance with the sum of the voltages induced in said arrays and for giving a second output in accordance with the difference of said voltages, two retransmitting aerials one at either side of the receiving aerials located approximately on the line through the receiving aerials substantially at right angles to the direction of reception of signals from the distant transmitter, transmitters feeding said retransmitting aerials and fed in turn by the said first output an auxiliary retransmitting aerial located in the neighbourhood of said retransmitting aerials fed in accordance with the said second output, whereby the said second output is maintained substantially zero and the said first output substantially independent of the transmissions from said retransmitting aerials.

4. A retransmitting system as claimed in claim 3 in which the auxiliary aerial is substantially collinear with the two retransmitting aerials.

5. A retransmitting system as claimed in claim 3 in which the auxiliary transmitter is displaced from the line through the retransmitting aerials and receiving aerials when the resultant field at the receiving aerials due to the retransmitting aerials is at an angle to said line.

6. A retransmitting system comprising two receiving directional aerial arrays, the angles the directions of optimum reception of said arrays being approximately equally inclined to the direction of reception of signals from a distant transmitter, means for giving a first output in accordance with the sum of the voltages induced in said arrays and for giving a second output in accordance with the difference of said voltages, two retransmitting aerials one at either side of the receiving aerials located approximately on the line through the receiving aerials substantially at right angles to the direction of reception of signals from the distant transmitter, transmitters feeding said retransmitting aerials and fed in turn by the said first output, two auxiliary retransmitting aerials, one positioned approximately on the line through the retransmitting aerials and the other displaced from said line, and means for feeding the amplified output of said second output to said auxiliary aerials whereby the said second output is maintained substantially zero and the said first output substantially independent of the transmissions from the retransmitting aerials.

7. A retransmitting system comprising two receiving directional aerial arrays, the angles the directions of optimum reception of said arrays being approximately equally inclined to the direction of reception of signals from a distant transmitter, means for giving a first output in accordance with the sum of the voltages induced in said arrays and for giving a second output in accordance with the difference of said voltages, a plurality of retransmitting aerials located approximately on the line through the receiving aerials substantially at right angles to the direction of reception of signals from the distant transmitter, transmitters feeding said retransmitting aerials and fed in turn by the said first output and means for feeding back in appropriate phase the said second output to at least one of the said arrays whereby the said second output is maintained substantially zero and the first output independent of the transmissions from the retransmitting aerials.

8. A retransmitting system as claimed in claim 7 wherein the fields at the receiving aerials due to transmissions from the retransmitting aerials substantially cancel out.

9. A retransmitting system comprising two receiving directional loop aerials, the planes of said loops being approximately equally inclined to the direction of reception of signals from a distant transmitter and intersecting with each other, means for giving a first output in accordance with the sum of the voltages induced in said receiving aerials and for giving a second output in accordance with the difference of said voltages, two retransmitting aerials one at either side of the receiving aerials located approximately on the line through the receiving aerials substantially at right angles to the direction of reception of signals from the distant transmitter, transmitters feeding said retransmitting aerials and fed in turn by the said first output and means for controlling the transmission from one of said retransmitting aerials in accordance with the said second output whereby the said second output is maintained substantially zero and the said first output substantially independent of the transmissions from said retransmitting aerials.

10. A retransmitting system comprising two directional loop aerials the planes of said loops being parallel to the direction of reception of signals from a distant transmitter and separated at right angles to said direction by an odd number of half wave-lengths of the transmission from said transmitter, means for giving a first output in accordance with the sum of the voltages induced in said receiving aerials and for giving a second output in accordance with the difference of said voltages, two retransmitting aerials one at either side of the receiving aerials located approximately on the line through the receiving aerials substantially at right angles to the direction of reception of signals from the distant transmitter, transmitters feeding said retransmitting aerials and fed in turn by the said first output and means for controlling the transmission from one of said retransmitting aerials in accordance with the said second output whereby the said second output is maintained substantially zero and the said first output substantially independent of the transmissions from said retransmitting aerials.

11. A retransmitting system comprising two receiving directional loop aerials, the planes of said loops being approximately equally inclined to the direction of reception of signals from a distant transmitter and intersecting with each other, means for giving a first output in accordance with the sum of the voltages induced in said receiving aerials and for giving a second output in accordance with the difference of said voltages, two retransmitting aerials one at either side of the receiving aerials located approximately on the line through the receiving aerials substantially at right angles to the direction of reception of signals from the distant transmitter, transmitters feeding said retransmitting aerials and fed in turn by the said first output, an auxiliary retransmitting aerial located in the neighbourhood of said retransmitting aerials fed in accordance with the said second output, whereby the said second output is maintained substantially zero and the said first output substantially independent of the transmissions from said retransmitting aerials.

12. A retransmitting system comprising two directional loop aerials the planes of said loops being parallel to the direction of reception of signals from a distant transmitter and separated at right angles to said direction by an odd number of half wave-lengths of the transmission from said transmitter, means for giving a first output in accordance with the sum of the voltages induced in said receiving aerials and for giving a second output in accordance with the difference of said voltages, two retransmitting aerials one at either side of the receiving aerials located approximately on the line through the receiving aerials substantially at right angles to the direction of reception of signals from the distant transmitter, transmitters feeding said retransmitting aerials and fed in turn by the said first output, an auxiliary retransmitting aerial located in the neighbourhood of said retransmitting aerials fed in accordance with the said second output, whereby the said second output is maintained substantially zero and the said first output substantially independent of the transmissions from said retransmitting aerials.

13. A retransmitting system comprising two receiving directional loop aerials, the planes of said loops being approximately equally inclined to the direction of reception of signals from a distant transmitter and intersecting with each other, means for giving a first output in accordance with the sum of the voltages induced in said receiving aerials and for giving a second output in accordance with the difference of said voltages, two retransmitting aerials one at either side of the receiving aerials located approximately on the line through the receiving aerials at right angles from the distant transmitter, transmitters feeding said retransmitting aerials so that the fields at the receiving aerials due to the transmissions from said retransmitting aerials substantially cancel out, said transmitters for said retransmitting aerials being in turn fed by the said first output, and means for feeding back in appropriate phase the said second output to at least one of the said directional loop aerials whereby the said second output is maintained substantially zero and the first output independent of the transmissions from the retransmitting aerials.

14. A retransmitting system comprising two directional loop aerials the planes of said loops being parallel to the direction of reception of signals from a distant transmitter and separated at right angles to said direction by an odd number of half wave-lengths of the transmission from said transmitter, means for giving a first output in accordance with the sum of the voltages induced in said receiving aerials and for giving a second output in accordance with the difference of said voltages, two retransmitting aerials one at either side of the receiving aerials located approximately on the line through the receiving aerials at right angles from the distant transmitter, transmitters feeding said retransmitting aerials so that the fields at the receiving aerials due to the transmissions from said retransmitting aerials substantially cancel out, said transmitters for said retransmitting aerials being in turn fed by the said first output, and means for feeding back in appropriate phase the said second output to at least one of the said directional loop aerials whereby the said second output is maintained substantially zero and the first output independent of the transmissions from the retransmitting aerials.

15. A radio receiver comprising two receiving aerial arrays, means for giving a first output in accordance with the sum of the signals induced in said arrays, means for giving a second output in accordance with the difference of the signals induced in said arrays and means for maintaining said difference output at a minimum.

16. A radio receiver comprising two directional aerial arrays, means for giving a first output in accordance with the sum of the signals induced in said arrays, means for giving a second output in accordance with the difference of the signals induced in said arrays, and means for maintaining said difference output at a minimum.

17. A radio receiving system comprising two directional receiving aerial arrays, means for giving a first output in accordance with the sum of the signals induced in said arrays, means for giving a second output in accordance with the difference of the signals induced in said arrays, a transmitter, means for feeding said transmitter with said first output and means for controlling the transmission from said transmitter by said second output to maintain the second output at a minimum.

18. A radio receiving system comprising two directional receiving aerial arrays, means for giving a first output in accordance with the sum of the signals induced in said arrays, means for giving a second output in accordance with the difference of the signals induced in said arrays, negative feed-back means from said second output to at least one of said arrays, whereby said second output is maintained at a minimum.

19. A radio retransmitting system comprising two receiving aerial arrays arranged to receive the transmissions from a distant transmitter, means for giving a first output in accordance with the sum of the voltages induced in said arrays and for giving a second output in accordance with the difference of said voltages, one or more retransmitters fed by the first output and transmitting at a frequency approximately equal to that of the transmissions of the distant transmitter and means for maintaining the second output at a minimum.

20. A radio retransmitting system comprising two receiving directional aerial arrays arranged to receive the transmissions from a distant transmitter, at least one retransmitting aerial located approximately on the line through the receiving arrays, the directions of optimum reception of said receiving arrays being substantially equally inclined to said line, means for giving a first output in accordance with the sum of the voltages induced in said arrays and for giving a second output in accordance with the difference of said voltages, means for feeding said retransmitting aerial with the amplified first output and means for maintaining the second output at a minimum or substantially zero.

JAMES ROBINSON.

REFERENCES CITED

The following references are of record in the file of this patent:

UNITED STATES PATENTS

| Number | Name | Date |
|---|---|---|
| 1,968,068 | Blancard et al. | July 31, 1934 |
| 2,396,883 | Robinson | Mar. 19, 1946 |
| 2,396,884 | Robinson | Mar. 19, 1946 |
| 2,456,666 | Agate et al. | Dec. 21, 1948 |